(12) United States Patent
Winter et al.

(10) Patent No.: US 7,352,956 B1
(45) Date of Patent: Apr. 1, 2008

(54) METHOD FOR IMPLEMENTING TRICKPLAY MODES IN A DATA STREAM RECORDER

(75) Inventors: Marco Winter, Hannover (DE); Harald Schiller, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/936,983

(22) PCT Filed: Mar. 6, 2000

(86) PCT No.: PCT/EP00/01929

§ 371 (c)(1),
(2), (4) Date: Sep. 19, 2001

(87) PCT Pub. No.: WO00/57421

PCT Pub. Date: Sep. 28, 2000

(30) Foreign Application Priority Data

Mar. 19, 1999 (EP) .................................. 99250083
Apr. 28, 1999 (EP) .................................. 99250139
Jul. 13, 1999 (EP) .................................. 99250231

(51) Int. Cl.
*H04N 5/91* (2006.01)

(52) U.S. Cl. .......................... 386/68; 386/46; 386/112; 386/125; 386/126; 386/80; 386/81; 386/95; 356/82; 348/412

(58) Field of Classification Search .................. 386/95, 386/96, 98, 111, 125, 46, 68, 112, 126; 348/412; 356/82
See application file for complete search history.

(56) References Cited

U.S. PATENT DOCUMENTS

| | | | | |
|---|---|---|---|---|
| 5,357,546 A | * | 10/1994 | Meriwether et al. | 375/240 |
| 5,835,636 A | * | 11/1998 | Auld | 382/233 |
| 5,870,523 A | * | 2/1999 | Kikuchi et al. | 386/95 |
| 6,154,603 A | * | 11/2000 | Willis et al. | 386/125 |

FOREIGN PATENT DOCUMENTS

| | | | |
|---|---|---|---|
| EP | 673 034 A2 | | 9/1995 |
| EP | 729 153 A2 | | 8/1996 |
| EP | 903 738 A2 | | 3/1999 |
| EP | 986 062 A1 | | 3/2000 |
| EP | 986 248 A1 | | 3/2000 |
| EP | 1021048 A2 | | 7/2000 |
| EP | 1 021 048 A2 | * | 12/2000 |

* cited by examiner

*Primary Examiner*—John Miller
*Assistant Examiner*—Jamie Jo Vent
(74) *Attorney, Agent, or Firm*—Joseph J. Laks; Robert B. Levy; Jorge Tony Villabon (57) ABSTRACT

Stream recording assumes e.g. a settop box to be connected to a DVD Streamer. The connection is e.g. of IEEE 1394 type using interfaces including transmitting and receiving firmware. Stream Data include one or more Stream Objects which each can be stored as a Program Stream as described in ISO/IEC 13818-1, Systems. The invention allows to realise Access Units in such DVD Streamer. Each Stream Object contains its own Access Unit data. A trickplay mode, e.g. fast forward, is performed by selecting the desired Access Units which are derived from a mapping list with incremental application packet arrival times.

16 Claims, 5 Drawing Sheets

| b7 | b6 | b5 | b4 | b3 | b2 | b1 | b0 |
|---|---|---|---|---|---|---|---|
| RTAU_FLG | AUD_FLG | AUSLL_FLG | AUEM_FLG | AUELL_FLG | PTSL_FLG | reserved | |

|  | Streamer | simple streamer less memory | Streamer is simple, add.memory is avail. | | Streamer with dedicated hardw. to parse streams, less memory | Streamer with dedicated hardw. to parse streams, add.mem. is avail. |
|---|---|---|---|---|---|---|
| STB | | | just enough for AUs | more memory | | |
| simple STB | coarse | - | - | - | SOBU | SOBU |
| | fine | - | - | - | -/packet | packet |
| | last | - | - | - | -/packet | packet |
| | PTS | - | - | - | -/yes | yes |
| | stream | - | - | - | yes | yes |
| STB sends AU list after record. | coarse | 2 SOBU/SOBU | 2 SOBU/SOBU | SOBU | SOBU | SOBU |
| | fine | APAT/packet | APAT/packet | packet | APAT/packet | packet |
| | last | APAT/packet | APAT/packet | packet | APAT/packet | packet |
| | PTS | yes | yes | yes | yes | yes |
| | stream | -/yes | -/yes | -/yes | yes | yes |
| STB sends AUs during record. | coarse | SOBU | SOBU | SOBU | SOBU | SOBU |
| | fine | -/packet | packet | packet | -/packet | packet |
| | last | -/packet | packet | packet | -/packet | packet |
| | PTS | - | yes | yes | -/yes | yes |
| | stream | yes | yes | yes | yes | yes |

METHOD FOR IMPLEMENTING TRICKPLAY MODES IN A DATA STREAM RECORDER

This application claims the benefit under 35 U.S.C. § 365 of International Application PCT/EP00/01929, filed Mar. 6, 2000, which claims the benefit of European Patent Application No. 99250083.5, filed Mar. 19, 1999, European Patent Application No. 99250139.5, filed Apr. 28, 1999, and European Patent Application No. 99250231.0, filed Jul. 13, 1999.

The invention relates to an improved trickplay processing for a data stream recorder, in particular a DVD based data stream recorder.

BACKGROUND

Stream recording assumes an application device, e.g. a settop box, connected to a DVD Streamer. Both devices are connected via e.g. an IEEE1394 (IEC 61883) interface including transmitting and receiving firmware.

Stream Data include one or more 'Stream Objects' which each can be stared as a 'Program Stream' as described in ISO/IEC 13818-1, Systems.

The following abbreviations are used in the description: APAT: application packet arrival time, ATS: application timestamp, AU: access unit, AUD: AU data, AUELL: access unit end location list, AUEM: access unit end map, AULL: access unit location list, AUSLL: access unit start location list, AUSM: access unit start map, DTS: decoding timestamp, DVD: digital versatile disc, DVD RTRW: DVD realtime rewritable, DVD VR: DVD video recording, EPG: electronic program guide, IAPAT: incremental application packet arrival time, MAPL: mapping list, LB: logical block, PAT: packet arrival time, PES: packetised elementary stream, PTS: presentation timestamp, SCR: system clock reference, SOB: stream object, SOBU: stream object unit, STB; set top box, S_PCK: stream pack, TOC: table of content.

A SOB can be terminated by a program_end_code. The value of the SCR field in the first pack of each SOB may be non-zero. A SOB contains the Stream Data packed into a sequence of Stream Packs. Stream data can be organised as one elementary stream and are carried in PES packets with a stream_id.

In Stream recording, the application performs its own padding so that the pack length adjustment methods of DVD-ROM Video or RTRW need not to be used. In Stream recording it is safe to assume, that the Stream packets will always have the necessary length.

Invention

The invention allows to realise Access Units. The resulting AUs have a resolution range from 2 SOBUs up to 'application packet' exact. The precision depends on the used DVD Streamer, i.e. whether the DVD Streamer knows the application and e.g. how much RAM memory is available. Therefore the precision depends on the design of the manufacturer. Each SOB contains its own AU data. This AUD consists of a general information, one or two coarse lists and one or two fine lists.

The coarse list is called the Access Unit Start Map AUSM. The AUSM consists of N flags (N is the number of SOBUs of this SOB). Each flag belongs to one SOBU. The flag indicates that:
  an AU points into the corresponding SOBU or into the next SOBU;
  no corresponding AU exists for that flag.

A fine list is called the Access Unit Location List AULL and contains the exact locations of the application packets of all AUs. For each AU indicating AUSM/AUEM flag there exists one location information inside AULL.

Two kinds of AULLs exist:

The part inside the AULL containing the start location is called the Access Unit Start Location List AUSLL. The part inside the AULL containing the end location is called the Access Unit End Location List AUELL.

The complete AU information of an SOB consists of either
  the sector & application packet location of the start of the AU and
  the sector & application packet location of the end of the data which starts at the AU (e.g. the end of the I-frame) and
  the PTS of the AU
  or
  the start APAT of the AU
  the end APAT of the AU (e.g. the end of the I-frame) and
  the PTS of the AU
  or
  the start ATS of the AU the Access Unit End Map AUEM of the AU (for the end ATS of the AUs)
  the end ATS of the AU, based on AUEM, not AUSM, and the PTS of the AU.

It is possible to have a subset only of the above values, e.g. AUSM or AUSM and AUEM.

It is one object of the invention to disclose a method and a recorder for implementing trickplay modes in a data stream recorder. This object is achieved by the features disclosed in claims 1 and 7.

Figure 3:
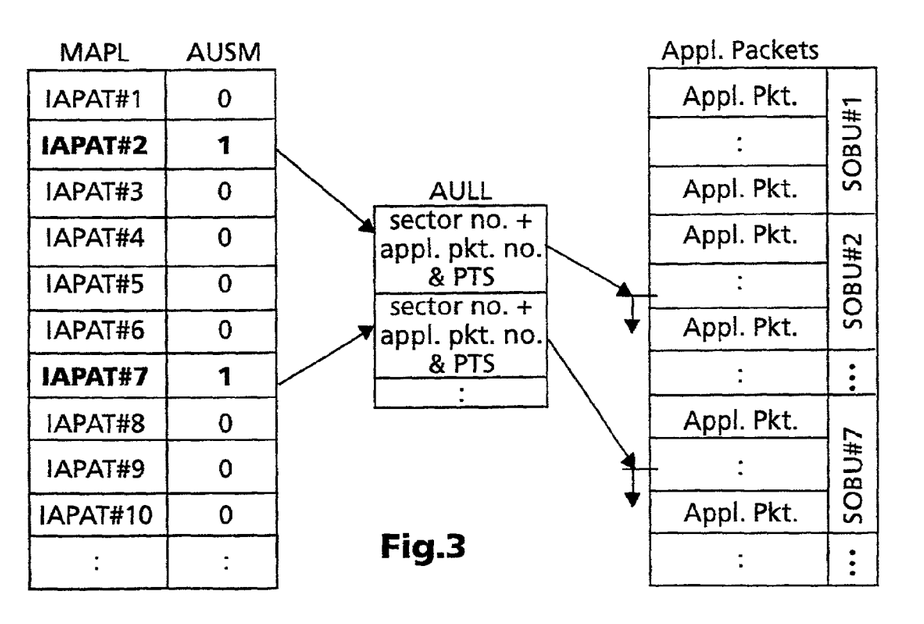
FIG. 3 access to application packet via AUSM and AULL.
Figure 4:
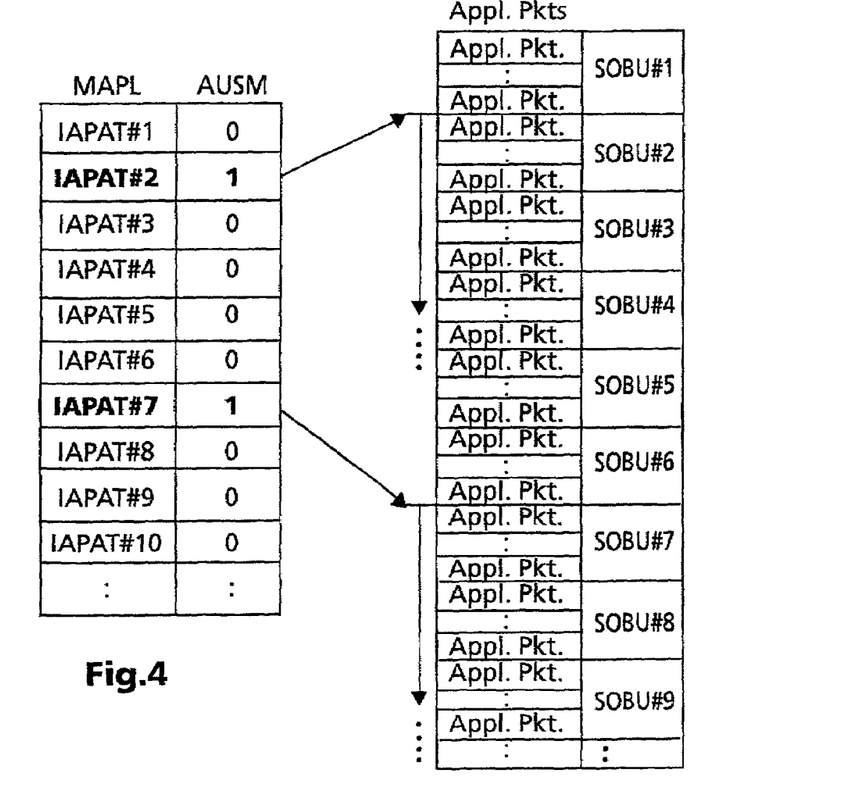
FIG. 4 access to application packet via AUSM, but without AULL.
Figure 5:
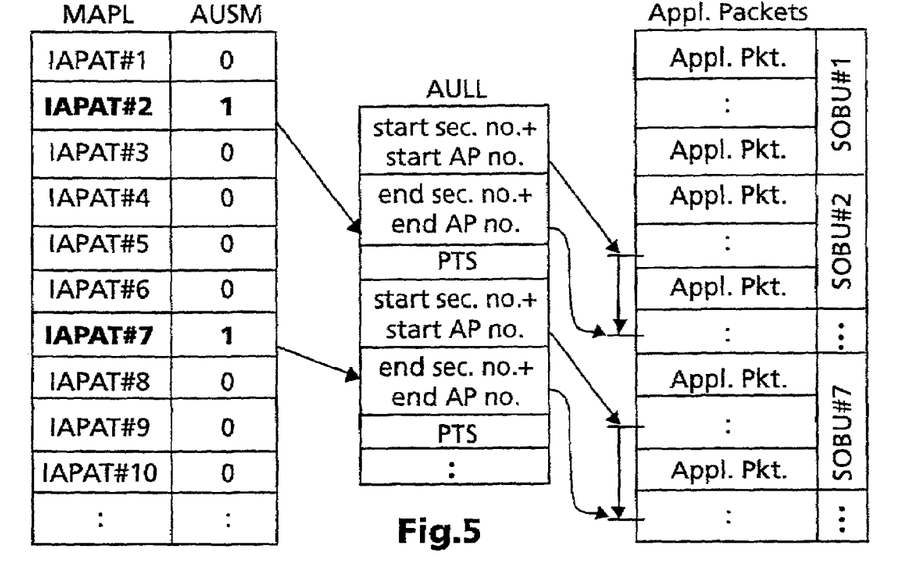
FIG. 5 access to application packet whereby AULL also contains end of AU information.

A trickplay mode, e.g. fast forward, is performed by selecting the desired AUs, e.g. each second AU, via AUSM/AUEM. The generation of AUSM, AUEM, AUSLL and AUELL during SOB recording is optional, i.e. is a matter of the manufacturer. The use of AUSM, AUEM, AUSLL and AUELL for trickplay modes is also optional. However, it is mandatory to update AUSM, AUEM and AULL in the case of editing. FIGS. 3 to 5 show three examples.

The DVD Streamer specification defines the syntax of the AUs, not the generation or use of the AUs. However, here are some examples for how to generate AUSM/AUEM and AULL:

A) The application device sends after transmission of the stream special data which contain a list of AU as APATs, i.e. each APAT of the list is the APAT of one of the just recorded application packets. The streamer must assign each APAT to the corresponding application packet:

A high end streamer generates a special list during stream recording. This list contains the APAT values of each recorded application packet and the corresponding location in the stream, e.g. sector No. and application packet No. When the application sends the AU list as a list of APATs, the streamer is able to generate all lists: AUSM/AUEM (SOBU accurate) and AULL.

A standard streamer has not enough memory to generate a list with APATs and application packet location information inside the local RAM. Therefore, in this case the streamer will generate only the AUSM (2 SOBU accurate), but not the AUEM and AULL. After that, a high end streamer could generate therefrom the accurate AULL and AUEM (SOBU accurate) and could refine AUSM SOBU accurate, e.g. during an idle mode of this high end streamer.

B) The streamer contains dedicated hardware to parse the incoming stream, i.e. the application is known by the streamer. This parser recognises automatically Access Units like I-pictures. With such additional hardware AUSM/AUEM (SOBU accurate) and AULL can be easily generated during stream recording.

C) The application uses special digital interface commands to mark an application packet as AU during transmission of the stream to the streamer. Then the streamer is able to generate AUSM/AUEM and AULL in parallel during stream recording if the digital interface is defined accordingly.

D) The application knows nothing about the streamer. In this case AUs will not be generated. After that a high end streamer can generate the missing AUSM/AUEM (SOBU accurate) and AULL, e.g. during idle mode of the streamer.

Trickplay modes can be applied with or without end of AU information.

Without end of AU information:

The trickplay mode, e.g. fast forward, is performed by searching for the desired AUs, e.g. each second AU, inside the AUSM. If existing, with AULL the exact location of the first application packet of the AU is known. Without AULL, the streamer assumes that the AU is located anywhere in the SOBU indicated by AUSM or in the following SOBU. The streamer jumps to this position and starts the transmission of the application packets to the application with the first application packet of this SOBU. The streamer stops the transmission after having transmitted a fixed amount of data, e.g. 1.8 Mbit or until the next AU, and jumps to the next desired AU. If the streamer knows the application it can parse the stream during transmission of the AU and will stop the transmission when the end of the AU is reached, e.g. the end of an I-picture.

If the stream contains AU flags (AU start/AU end), then the transmission of the AU can also be performed application packet accurate.

With end of AU information:

The only difference to the first alternative is that, if the AULL exists, the transmission of an AU to the application device stops with the transmission of the last application packet of the AU.

Bitstream data (start and end marks) and navigation data (for AUSM, AUEM, AULL) are stored on the disc separately, i.e. in different files.

In principle, the inventive method is suited for implementing trickplay modes in a bitstream recorder, wherein the bitstream is organised in stream objects and access to the bitstream is performed using access units and access unit information is attached to the stream objects of the bitstream and to navigation data to be recorded, and wherein said access unit information includes an access unit start map, and optionally an access unit end map, which are used in the trickplay modes together with the navigation data for access to the bitstream.

In principle, the inventive bitstream recorder is suited for implementing trickplay modes, wherein the bitstream is organised in stream objects and access to the bitstream is performed using access units and access unit information is attached to the stream objects of the bitstream and to navigation data to be recorded, and wherein said access unit information includes an access unit start map, and optionally an access unit end map, which are used in the trickplay modes together with the navigation data for access to the bitstream.

Advantageous additional embodiments of the invention are disclosed in the respective dependent claims.

DRAWINGS

Embodiments of the invention are described with reference to the accompanying drawings, which show in.

EXEMPLARY EMBODIMENTS

Figure 1:
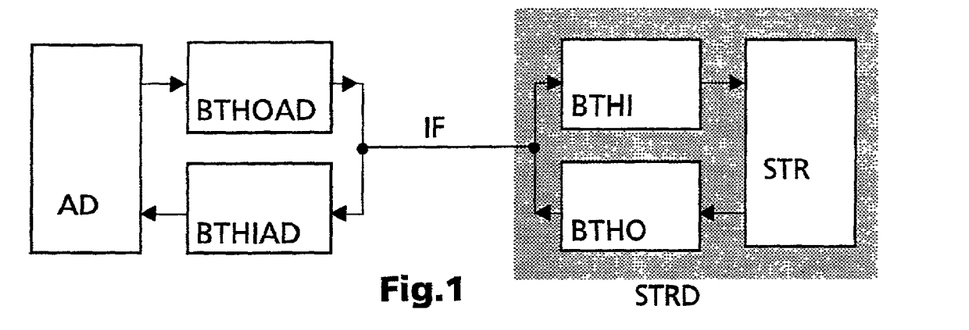
FIG. 1 simplified overall system for DVD Stream Recording.

FIG. 1 shows a simplified block diagram of a settop box AD and a Stream recorder device STRD. AD interacts via an interface IF, e.g. an IEEE1394 interface, with STRD. AD sends its data via output buffering & timestamping handling means BTHOAD to IF and receives from IF data via input buffering & timestamping handling means BTHIAD. A streamer STR within STRD sends its data via output buffering & timestamping handling means BTHO to IF and receives from IF data via input buffering & timestamping handling means BTHI.

Instead of an IEEE1394 connection any other network like the Ethernet or the Internet can be used.

Instead of a settop box any other data stream source can be used, e.g. a DVD player or a PC or Internet receiver.

The DVD Stream Recording system is designed to use rewritable DVD discs for recording existing digital bitstreams, editing them and playing them back as bitstreams. This system is designed to satisfy the following requirements:

A timing mechanism, i.e. a time stamp is added to every broadcast packet to enable proper packet delivery during playback.

To enlarge the fields of applications, non-real-time recording should be possible. However, in this case the STB has to generate the timestamp information.

Data allocation strategy and a file system to support real-time stream recording.

Many digital services require Service Information which normally is embedded in the real-time stream. To support a STB fed by data from a DVD player, the DVD should provide additional space, which can be used by the STB to duplicate part of the service information and to add additional TOC information.

Copy Protection must be supported. In addition, any scrambling performed by the service provider or the STB must be kept unchanged.

User requirements can be grouped into requirements for recording, requirements for playback, and requirements for editing:

Real-Time Recording

The system is designed to enable real-time recording of digital streams. It allows the user to concatenate recordings, even if those recordings consist of different stream formats. If recordings are concatenated, a seamless or close-to-seamless playback feature can be achieved, but is not required.

Navigation Support

To support navigation two pieces of information (lists) are generated during recording:

1) An 'original' version of a play list. This list contains quite low level information, e.g. time map or (broadcast) packet order of the recording. This list is accessible by the STB and the content is understood by the DVD streamer as well as by the STB. In its original version the playlist enables the playback of a complete recording. The playlist may be accessed and extended after recording by the STB to allow more sophisticated playback sequences.

2) The second piece of information, a mapping list, is generated to support the stream recorder to retrieve packet stream chunks (cells), that are described in terms of the application domain, e.g. 'broadcast packets' or 'time'. This list is owned and understood by the DVD streamer only.

Content Description

The system can reserve space which can be used by the STB to store high-level TOC and Service Information. This information is provided for the user to navigate through the content stored on disc and may contain sophisticated EPG information. The content needs not to be understood by the stream recorder. However a common subset of the TOC information, e.g. based on a character string, may be useful to be shared between STB and DVD, in order to enable the stream recorder to provide a basic menu by itself.

Player Menus for Access Unit Selection

Playback of individual recording and playing all recordings sequentially is possible via a play list.

The STB can generate a sophisticated menu based on the TOC information stored on the disc. A simple menu is generated by the streamer itself, e.g. via some 'character' information which is shared by STB and DVD.

The DVD streamer creates the 'original version' of the play list. It can allow extensions and modifications of the play list by the STB for more sophisticated playback features.

The DVD streamer is not responsible for the content of those sophisticated playlist(s).

The system supports the deletion of single recordings on user's request. Preferably the system allows this feature under the control of the STB.

The system may support insert editing.

Concerning the directory and file structure, the organisation of Stream Data and Navigation Data of DVD Stream Recording is done in a specific way such as to take into account the following:

Any DVD Streamer device has certain requirements to store its own housekeeping data or Streamer-specific navigation data on the disc. These data are solely for helping the retrieval of recorded data; they need not be understood or even be visible to any outside application device AD.

Any DVD Streamer device needs to communicate with the application device AD it is connected to. This communication is as universal as possible so that the maximum possible range of applications can be connected to the Streamer. The Navigation Data to support such communication are called Common navigation data and must be understandable by the Streamer as well as by the application device.

The Streamer device offers to the connected application device AD a means for storing its own private data of any desired kind. The Streamer needs not to understand any of the content, internal structure, or meaning of this application-specific navigation data.

Figure 2:
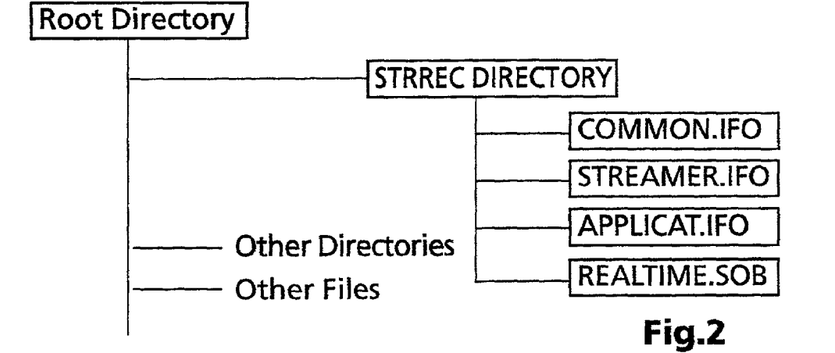
FIG. 2 basic directory and file structure.

A possible directory and file structure is described in connection with FIG. 2. Under the root directory, the files storing the disc content are placed under the STRREC directory. Under the STRREC directory the following files are created:

COMMON.IFO
Basic information to describe the stream content. Needs to be understood by the Application Device as well as the Streamer.

STREAMER.IFO
Private housekeeping information specific to the Streamer Device. Needs not to be understood by the Application Device.

APPLICAT.IFO
Application Private Data, i.e. information that is specific to the Application(s) connected to the Streamer. Needs not to be understood by the Streamer.

REALTIME.SOB
Recorded real-time stream data proper.

Note that except for the files described above, the STRREC directory shall not contain any other files or directories.

The DVD Streamer Format Draft, version 0.3, realises trick play support by the Entry Point Data of Section 2.2.3.3.3. According to the invention, some of these features have been revised in order to allow improved trickplay modes. The invention takes the following into account:

The sector based addressing mechanism has been deleted.

The wordlength of the time based addressing information has been changed from a 6 byte time value of the APAT type to a 4 byte time value of the ATS type. As a side effect, a second bit flag array AUEM has been introduced in parallel to the already existing AUSM. In this new format, the time based address information is not only more compact, but also more directly usable.

All 'Entry Point XXX' terms have been renamed to 'Access Unit XXX' in order to avoid confusion with the user controlled Entry Points in Cell Information, which still exist.

The invention can also be used without value AULL.

Figure 7:
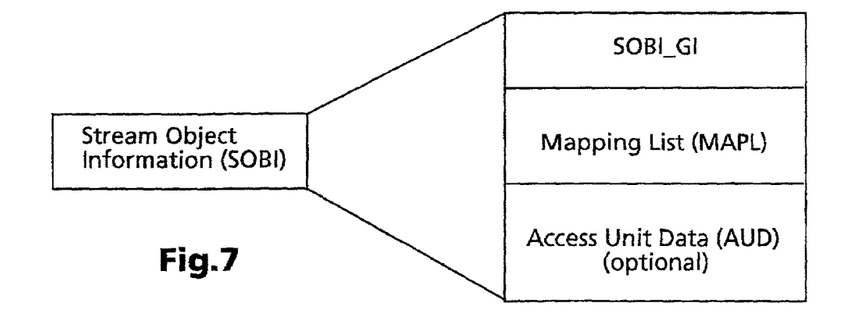
FIG. 7 structure of a Stream Object Information.

As shown in FIG. 7 the Stream Object Information SOBI includes the Stream Object Information General Information SOBI_GI, the Mapping List MAPL and the Access Unit Data AUD, if any. The mapping list includes incremental application packet arrival times and is described in more detail in EP 98250387.2 of the applicant.

SOBI_GI may have the following format:

| | Contents | Number of Bytes |
|---|---|---|
| (1) SOB_TY | SOB Type | 1 |
| (2) SOB_REC_TM | SOB Recording Time | 5 |
| (3) SOB_STI_N | SOB Stream Information Number | 1 |
| (4) AUD_FLAGS | Access Unit Data Flags | 1 |
| (5) SOB_S_APAT | SOB Start APAT | 6 |
| (6) SOB_E_APAT | SOB End APAT | 6 |
| (7) SOB_S_SOBU | first SOBU of this SOB | 4 |
| (8) MAPL_ENT_Ns | number of Mapping List entries | 4 |
| | Total | 28 |

(1) SOB_TY

Describes the Stream Object Type, containing bits for Temporal Erase state (TBD) and for Copy Generation Management System (TBD).

(2) SOB_REC TM

Describes the recording time of the associated Stream Object in DVD Stream Recording's Date and Time Describing Format defined above.

(3) SOB_STI_N

Describes the index of the SOB_STI which is valid for this Stream Object.

(4) AUD_FLAGS

Figure 8:
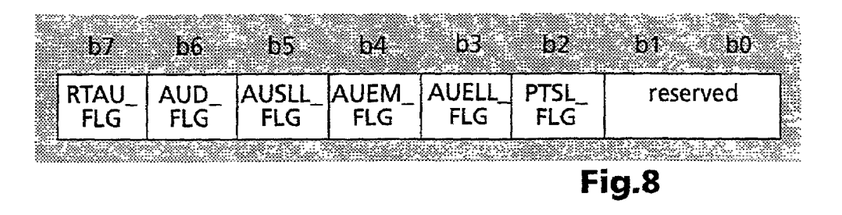
FIG. 8 structure of the AUD_FLAG byte.

Indicates whether and what kind of Access Unit Data exist for this SOB. If Access Unit Data exist, then AUD_FLAGS also describes several properties of the Access Unit Data. The Access Unit Data itself is described below and includes the number of Entry Points and the tables AUSM, AUSLL, AUEM, AUELL and PTSLL. The content of AUD_FLAGS is depicted in FIG. 8.

| RTAU_FLG | 0: no AU flags exist inside the RT Data of this SOB |
| --- | --- |
| | 1: AU flags may exist inside the RT Data of this SOB. This state is even allowed, when no further Access Unit Data exist for this SOB, i.e. if AUD_FLG = 0b. |
| AUD_FLG | 0: no Access Unit Data exist for this SOB. The bits b5, b4, b3 and b2 of EP_FLAGS shall be set to 0. |
| | 1: Some Access Unit Data (as further specified by the subsequent flags) exist for this SOB, behind the MAPL. |
| AUSLL_FLG | 0: no AUSLL of this SOB exists |
| | 1: AUSLL of this SOB exists |
| AUEM_FLG | 0: no AUEM of this SOB exists. AUELL_FLG must then also be set to 0b. |
| | 1: AUEM of this SOB exists |
| AUELL_FLG | 0: no AUELL of this SOB exists |
| | 1: AUELL of this SOB exists. Is only allowed if AUEM_FLG = 1b. |
| PTSL_FLG | 0: no PTSL of this SOB exists |
| | 1: PTSL of this SOB exists |

(5) SOB_S_APT

Describes the start Application Packet Arrival Time APAT of the Stream Object, i.e. the packet arrival time of the first packet belonging to the SOB. SOB S APAT is described in DVD Stream Recording's PAT Describing Format defined below: PATs are divided into two parts, namely a base part and an extension part. The base part PAT_base (bits 9 to 47) holds the so-called 90 kHz unit value, and the extension part PAT_exten (bits 0 to 8) holds the less significant value measured in 27 MHz:

PAT in seconds=PAT_base/90 kHz+PAT_exten/27 MHz For a unique representation of times, PAT_exten must be in the range of $0 \leq$ PAT_exten $<300$. Together, PAT_base and PAT exten cover a range of more than 1696 hours.

(6) SOB_E_APAT

Describes the end Application Packet Arrival Time of the Stream Object, i.e. the packet arrival time of the last packet belonging to the SOB, in DVD Stream Recording's PAT Describing Format.

(7) SOB_S_SOBU

Describes the number of the start Stream Object Unit, i.e. the Stream Object Unit containing the first Application Packet of the Stream Object.

(8) MAPL_ENT_Ns

Describes the number of Mapping List entries to follow after SOBI_GI.

Figure 9:
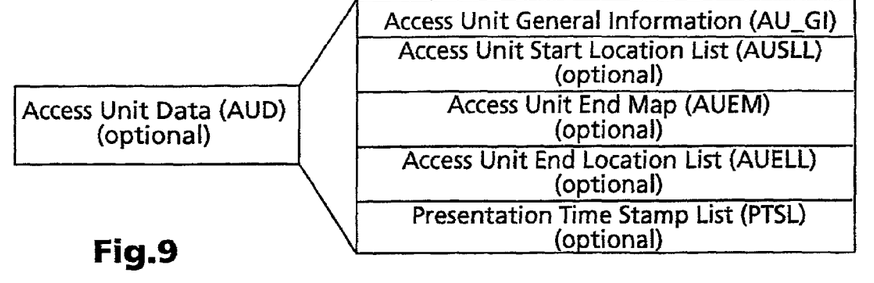
FIG. 9 structure of the Access Unit Data.

As shown in FIG. 9, the Access Unit Data AUD, if any, include the Access Unit General Information AU GI, and may also include the Access Unit Start Location List AUSLL, the Access Unit End Map AUEM, the Access Unit End Location List AUELL and/or the Presentation Time Stamp List PTSL. Which of these parts exist is indicated by AUD_FLAGS of SOBI_GI, see above.

AU_GI only exists if AUD FLAGS of SOBI_GI indicates that Access Unit Data exist.

| | Contents | Number of Bytes |
| --- | --- | --- |
| (1) AU_Ns | number of Access Units | 4 |
| (2) AUSM | Access Unit Start Map | (MAPL_ENT_Ns+7) div 8 |
| | (MAPL_ENT_Ns entries) | |
| | Total | 4 + (MAPL_ENT_Ns+7) div 8 |

(1) AU Ns

Describes the number of Access Units described for this SOB. At the same time, AU_Ns describes the number of locations where AUSM indicates the existence of an Access Unit.

(2) AUSM

The Access Unit Start Map indicates which of the SOBUs of this SOB contain Access Units. For each SOBU of the SOB, exactly one AUSM entry exists. Therefore the AUSM consists of MAPL_ENT_Ns entries. Each AUSM entry indicates an accessible Access Unit somewhere within the corresponding SOBU or within the subsequent SOBU. Exactly AU_Ns Access Units are indicated by the AUSM, equivalent to exactly AU_Ns bits of AUSM being equal to '1'.

AUSM shall be byte aligned. If the concatenated AUSM entries consist of a number of bits which are not an integer multiple of '8', then the remaining LSBs of the last byte of the AUSM shall be the necessary additional padding bits. These alignment bits shall be set to '0'.

Figure 10:
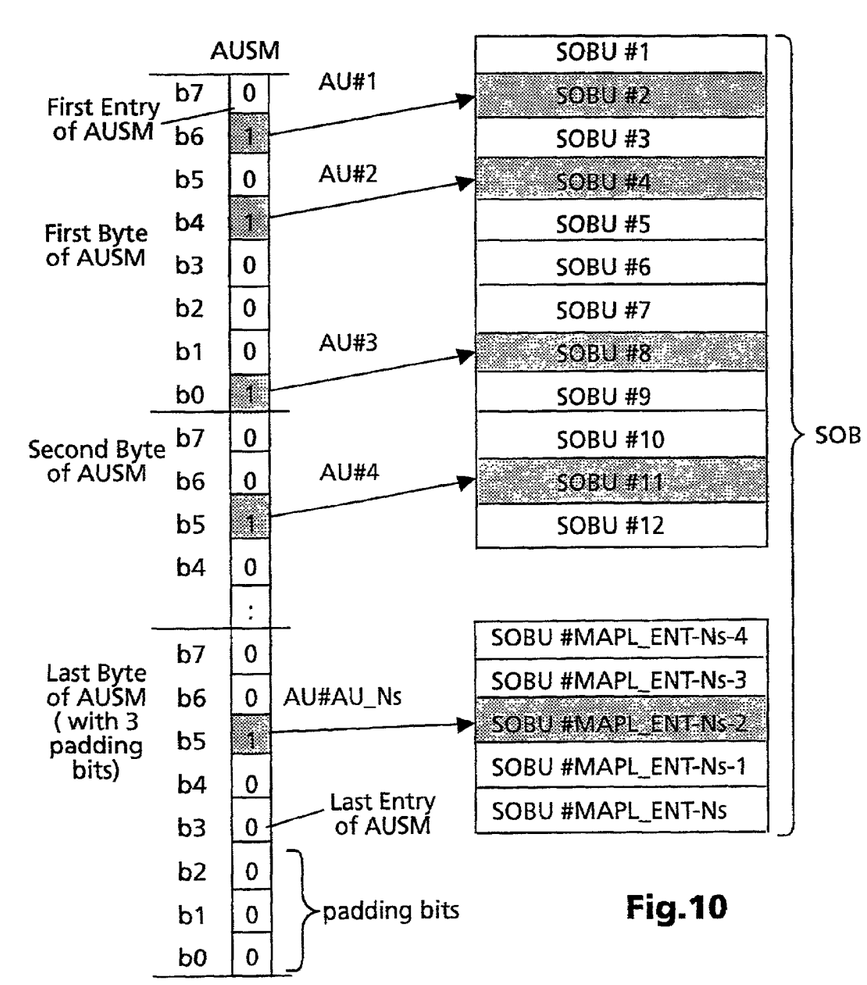
FIG. 10 example of an AUSM and its corresponding SOBUs.

FIG. 10 shows an example of an AUSM and its corresponding SOBUs. With this kind of Access Unit Data, no more than one addressable Access Unit can be described per each SOBU of the SOB.

Concerning the Access Unit Start Location List AUSLL, Access Unit End Map AUEM and Access Unit End Location List AUELL, AUSLL is a list of location information to find the application packet where the bitstream segments of the Access Units start. Therefore, if AUSLL exists, each Access Unit as marked in AUSM has exactly one AUSLL entry associated to it. AUEM, if it exists, is a bit array of the same length as AUSM. The bits in AUEM indicate which of the SOBUs contain the end of the bitstream segment associated with the Access units of the SOB. The number of bits set in AUEM must be equal to the number of bits set in AUSM.

AUELL, if it exists, is a list of location information to find the exact application packet where the bitstream segments of the Access Units stop. Therefore, if AUELL exists, each Access Unit as marked in AUEM has exactly one AUELL entry associated to it. Each application packet, indicated by the AUELL entries, is the last application packet belonging to the Access Unit.

The entries of AUSLL and AUELL are in ascending order, i.e.

the first AUSLL/AUELL entry is associated to the SOBU number, where AUSM/AUEM—read from the left to the right—has a bit set to '1' for the first time the second AUSLL/AUELL entry is associated to the SOBU number, where AUSM/AUEM—read from the left to the right—has a bit set to '1' for the second time and so on.

The entries of AUSLL and AUELL are time based, i.e. their entries are defined as

| | Contents | Number of Bytes |
|---|---|---|
| (1) AU_ATS | ATS of the designated Application Packet | 4 |
| | Total | 4 |

(1) AU_ATS

Figure 11:
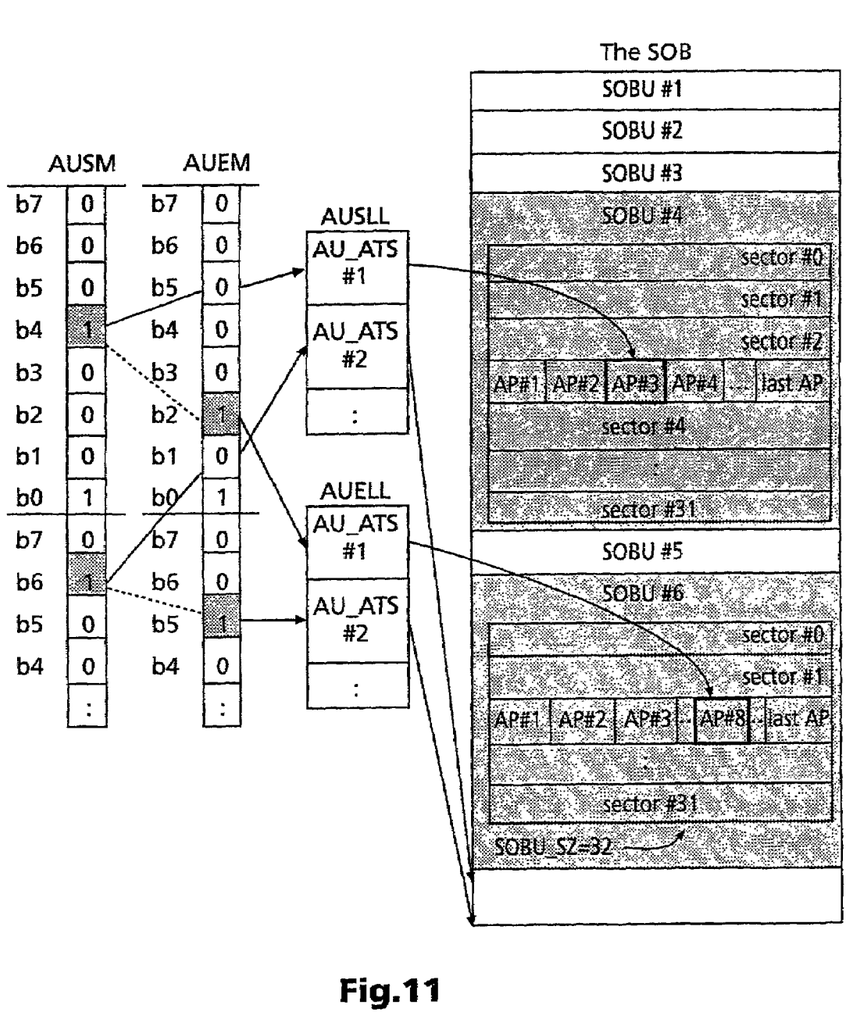
FIG. 11 example of AUSM, AUSLL, AUEM, AUELL and the related data access mechanism.

AU_ATS describes the Application Time Stamp of an application packet inside the SOBU associated with this entry. When data readout has begun at the start of the SOBU, these AU_ATS are identified by comparing them with the individual ATS of the Application Packets inside the bitstream data. FIG. 11 shows an example of AUSM, AUSLL, AUEM, AUELL and the related data access mechanism.

The Presentation Time Stamp List PTSL is the list of the Presentation Time Stamps of all the Access Units of the SOB, i.e. if PTSL exists, each Access Unit has exactly one corresponding PTSL entry, and PTSL then has AU_Ns entries. The entries of PTSL are in ascending order, i.e.
   the first PTSL entry is associated to the Access Unit occurring first inside AUSM
   the second PTSL entry is associated to the Access Unit occurring second inside AUSM
   and so on.
Each PTSL entry is defined as

| | Contents | Number of Bytes |
|---|---|---|
| (1) PTS | PTS of the corresponding Access Unit | 4 |
| | Total | 4 |

Figure 6:
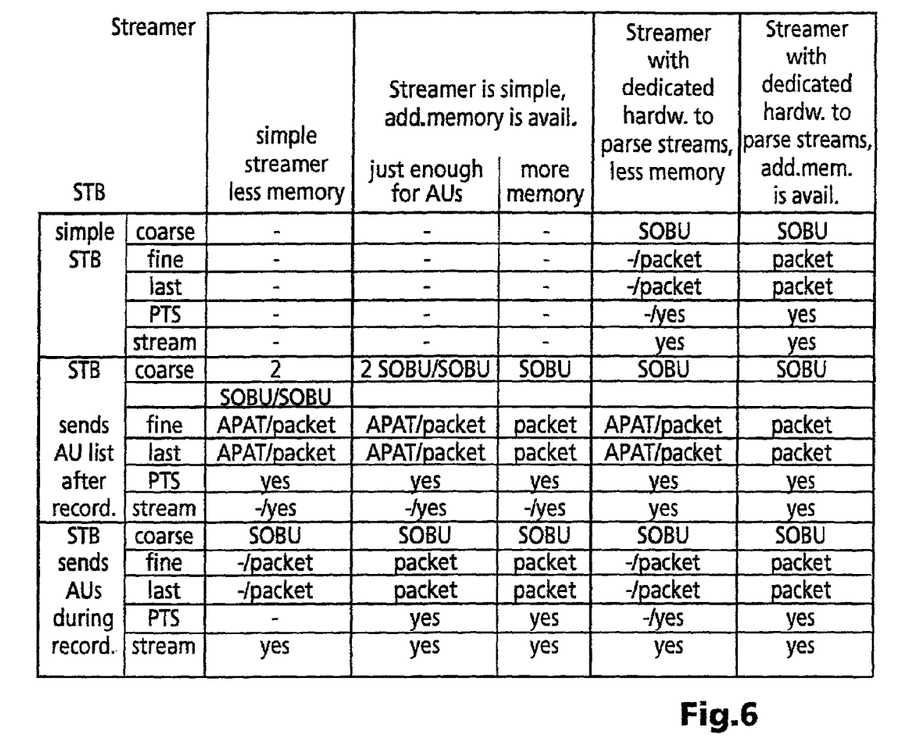
FIG. 6 table showing the maximum possible Access Unit support which is storable by a specific configuration.

The entries of the table depicted in FIG. 6 show the maximum possible Access Unit support which is storable by the described configuration. This is the performable support just after an SOB recording. If an entry consists of two states, separated by a slash, that entry describes the following:
   left side of the slash: the status just after the recording of a SOB
   right side of the slash: the status after a second offline session, e.g. an hour at night.
Some explanations for using this Access Unit Support table:
   SOBU desired application packet is in the indicated SOBU;
   2 SOBU desired application packet is in the indicated SOBU or in the following SOBU;
   APAT complete APAT of the desired application packet. The streamer is not able to calculate directly the sector and application packet number from the APAT, i.e. an access to the application must be performed via the MAPL;
   packet exact and direct application packet location. The location is given by a sector number and the application packet number inside this sector.

Different DVD Streamer types are listed horizontally:
simple Streamer, less memory:
   A streamer without any dedicated knowledge about the application STB. The streamer has just enough RAM to store a coarse list which indicates the SOBUs containing an AU.
Streamer is simple but additional memory is available:
   Similar to the previous streamer. The only different is
   a) just enough memory for AUs: the streamer has additional RAM to store the complete AU information (a coarse list+AU start location+AU end location+PTS);
   b) more memory: the streamer has additional RAM to store the complete AU information (coarse list +AU start location+AU end location+PTS) and the exact packet location+ATS inside the RAM for each incoming application packet during recording.
Streamer with dedicated hardware to parse streams, less memory:
   the streamer has just enough RAM to store a list which indicates the SOBUs containing an AU. The streamer knows the application, i.e. the streamer is able to find the AUs (start, end and PTS) during recording and playback due to the implemented stream parser.
Streamer with dedicated hardware to parse streams, additional memory is available:
   this streamer has additional RAM to store the complete AU information (coarse list+AU start location+AU end location+PTS). The streamer knows the application, i.e. the streamer is able to find the AUs (start, end and PTS) during recording and playback due to the implemented stream parser.
Various application device types are listed vertically:
simple STB:
   the application is not aware of the existence of the streamer.
STB sends AU list after recording:
   the application knows that a streamer records the sent application packets. After recording of a take (SOB) the application sends a list of AU information (AU start ATS+AU end ATS+PTS) to the streamer.
STB sends AUs during recording:
   the application knows that a streamer records the sent application packets. During recording of a take (SOB) the application sends in parallel, e.g. via an isochronous channel, AU information (AU start ATS+AU end ATS+PTS) to the streamer.
The navigation data related to one Access Unit includes four items of information:
coarse:
   coarse list. The list describes the SOBUs which have an AU.
fine:
   fine list. This list describes the unambiguous location of the AU either as APAT or as sector number+application number inside this sector.
last:
   fine list of the last application packet which belongs to this AU. It's also a list of the unambiguous location of each AU either as APAT or as sector number+application number inside this sector.
PTS:
   list of PTSs. Each AU has exact one PTS.

stream:
means AU marks inside the stream. If 'yes' the stream contains additional information for the streamer to detect such application packets which contain an AU start or an AU end.

The invention claimed is:

1. A method for recording a bitstream on a bitstream recorder such that the recorded bitstream can be replayed in a trick play mode, the method comprising:
recording said bitstream in predetermined-size stream object units, said recorded bitstream having data contained in application packets that are contained
in said stream object units;
defining access units as parts of said recorded bitstream that are accessible for said trick play mode, wherein access unit information is associated with said bitstream and with related navigation data to be recorded; and
recording an access unit start map for said access unit information, wherein in said access unit start map a respective single flag is assigned to each one of said stream object units, each of said flags indicating with a first value that the start of one of said access units is contained within a range of said recorded bitstream consisting of a corresponding stream object unit and the immediately subsequent stream object unit, or indicating with a second value that no corresponding access unit exists for that flag and its related stream object unit.

2. The method of claim 1, wherein said access unit information includes an access unit start location list having a number of entries that matches the number of flags in said access unit start map having said first value, and wherein each successive flag of said access unit start map having said first value is associated with a corresponding location information in said access unit start location list, which in turn identifies the location of a first application packet of the corresponding access unit within the corresponding stream object units.

3. The method of claim 1, further comprising the step of:
recording an access unit end map for said access unit information, wherein said access unit end map comprises a bit array of a same length as said access unit start map, and wherein in said access unit end map a respective flag is assigned to each of said stream object units, said flag indicating with a first value that the associated stream object unit contains the end of one of said access units, the beginning of which has been indicated by a flag within said access unit start map.

4. The method of claim 3, wherein said access unit information includes an access unit end location list having a number of entries that matches the number of flags in said access unit end map having said first value and wherein each successive flag in said access unit end map having said first value is associated with a corresponding location Information in said access unit end location list, which in turn describes the location of the last application packet of the corresponding access unit within the corresponding stream object units.

5. The method of claim 3, wherein the index of each access unit end map entry having said first value is equal to or greater than the entry index of its corresponding access unit start map entry having said first value, and is less than the index of the immediately following access unit start map entry having said first value if any following access unit start map entry exists.

6. The method of claim 4, wherein the index of each access unit end map entry having said first value is equal to or greater than the entry index of its corresponding access unit start map entry having said first value, and is less than the index of the immediately following access unit start map entry having said first value if any following access unit start map entry exists.

7. The method of claim 1, wherein said trick play mode includes at least one of a fast forward, fast reverse, slow motion, single picture step and still picture trick play modes.

8. The method of claim 1, wherein the recorded bitstream contains access unit start and access unit end marks which indicate the start or the end of an access unit, respectively.

9. The method of claim 1, wherein said access unit start map is byte aligned and wherein, if the concatenated access unit start map entries consist of a number of bits which is not an integer multiple of eight, then the remaining least significant bits of the last byte of the access unit start map are filled with a corresponding number of padding bits.

10. A method for replaying in a trick play mode a bitstream that was recorded on a bitstream recorder according to the method of claim 1, said method comprising the step of:
replaying in said trick mode the parts of the recorded bitstream which are related to the access units that are selected by evaluating the flags in said access unit start map.

11. The method of claim 10, wherein said access unit Information includes an access unit start location list having a number of entries that matches the number of flags in said access unit start map having said first value, wherein each successive flag of said access unit start map having said first value is associated with a corresponding location information in said access unit start location list, which in turn describes the location of the first application packet of a corresponding access unit within the corresponding stream object units, and
wherein said bitstream parts replayed in said trick mode are selected by evaluating the flags in said access unit start map and the corresponding location information in said access unit start location list.

12. The method of claim 10, further comprising the steps of:
when replaying in said trick mode corresponding parts of the recorded bitstream, said parts are also related to access units that are selected by evaluating the flags in an access unit end map,
wherein an access unit end map is additionally recorded for said access unit information and said access unit end map is a bit array of the same length as said access unit start map, and wherein in said access unit end map one flag is assigned to each one of said stream object units, said flag indicating with a first value that the associated stream object unit contains the end of one of said access units, the beginning of which has been indicated by a flag within said access unit start map.

13. The method of claim 12, wherein said access unit information includes an access unit end location list having a number of entries that matches the number of flags in said access unit end map having said first value, wherein each successive flag in said access unit end map having said first value is associated with a corresponding location information in said access unit end location list, which in turn describes the location of the last application packet of the corresponding access unit within the corresponding stream object units; and wherein said bitstream parts replayed in said trick mode are selected by additionally evaluating the flags in said access unit end map and the corresponding location information in said access unit end location list.

14. The method of claim 12, wherein the index of each access unit end map entry having said first value is equal to or greater than the entry index of its corresponding access unit start map entry having said first value, and is less than the index of the immediately following access unit start map entry having said first value if any following access unit start map entry exists.

15. The method of claim 13, wherein the index of each access unit end map entry having said first value is equal to or greater than the entry index of its corresponding access unit start map entry having said first value and is less than the index of the immediately following access unit start map entry having said first value if any following access unit start map entry exists.

16. A bitstream recorder comprising:

means for recording a bitstream using a method according to claim 1; and means for replaying in a trick play mode a bitstream using a method according to claim 10.

* * * * *